(12) United States Patent
Kim et al.

(10) Patent No.: US 10,051,656 B2
(45) Date of Patent: Aug. 14, 2018

(54) OPERATION METHOD USING DOWNLINK ORIENTED CHANNEL IN WIRELESS LAN SYSTEM

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 251 days.

(21) Appl. No.: 15/102,864

(22) PCT Filed: Dec. 5, 2014

(86) PCT No.: PCT/KR2014/011908
§ 371 (c)(1),
(2) Date: Jun. 8, 2016

(87) PCT Pub. No.: WO2015/088197
PCT Pub. Date: Jun. 18, 2015

(65) Prior Publication Data
US 2018/0152960 A1    May 31, 2018

Related U.S. Application Data

(60) Provisional application No. 61/914,920, filed on Dec. 11, 2013, provisional application No. 61/925,227, filed on Jan. 9, 2014.

(51) Int. Cl.
*H04W 72/12* (2009.01)
*H04W 72/04* (2009.01)
(Continued)

(52) U.S. Cl.
CPC ....... *H04W 72/1273* (2013.01); *H04W 48/12* (2013.01); *H04W 72/042* (2013.01); *H04W 74/0816* (2013.01); *H04W 76/27* (2018.02)

(58) Field of Classification Search
CPC ............ H04W 72/1273; H04W 48/12; H04W 74/0816; H04W 72/042; H04W 76/27
See application file for complete search history.

(56) References Cited

U.S. PATENT DOCUMENTS 7,006,464 B1   2/2006  Gopalakrishnan et al.
7,466,660 B2 * 12/2008  Pani ..................... H04W 84/12
                                                                 370/252
(Continued)

FOREIGN PATENT DOCUMENTS

WO    2013-085269    6/2013

OTHER PUBLICATIONS

PCT International Application No. PCT/KR2014/011908, Written Opinion of the International Searching Authority dated Mar. 18, 2015, 18 pages.

*Primary Examiner* — Brian D Nguyen
(74) *Attorney, Agent, or Firm* — Lee, Hong, Degerman, Kang & Waimey

(57) ABSTRACT

The present document relates to a wireless communication system and, more particularly, to a method for performing communication using a downlink (DL) oriented channel in a high-density wireless LAN system and an apparatus therefor. A particular station STA1 configured therefor connects with an AP through a normal channel, switches to a downlink oriented channel during an active mode operation, and receives data from the AP through the DL oriented channel. Meanwhile, data is transmitted to the AP through switching to the normal channel. Here, the first station obtains information on a specific interval for receiving data from the AP through the downlink oriented channel, switches to the (Continued)

normal channel during an interval other than the specific interval, and transmits data to the AP.

14 Claims, 14 Drawing Sheets

(51) Int. Cl.
    *H04W 48/12*     (2009.01)
    *H04W 74/08*     (2009.01)
    *H04W 76/27*     (2018.01)

(56) References Cited

U.S. PATENT DOCUMENTS

| | | |
|---|---|---|
| 2005/0013287 A1 | 1/2005 | Wallentin et al. |
| 2005/0221833 A1 | 10/2005 | Granzow et al. |
| 2009/0073948 A1* | 3/2009 | Pani .................. H04W 84/12 370/338 |
| 2010/0246419 A1* | 9/2010 | Batta .................. G01S 5/14 370/252 |
| 2010/0290416 A1* | 11/2010 | Ko .................. H04W 48/12 370/329 |
| 2012/0263094 A1 | 10/2012 | Wentink |
| 2013/0010731 A1* | 1/2013 | Diener .................. H04N 7/148 370/329 |

* cited by examiner

Additional AM-TIM element format

Additional AM-TIM element format

OPERATION METHOD USING DOWNLINK ORIENTED CHANNEL IN WIRELESS LAN SYSTEM

CROSS-REFERENCE TO RELATED APPLICATIONS

This application is the National Stage filing under 35 U.S.C. 371 of International Application No. PCT/KR2014/011908, filed on Dec. 5, 2014, which claims the benefit of U.S. Provisional Application No. 61/914,920, filed on Dec. 11, 2013, and 61/925,227, filed on Jan. 9, 2014, the contents of which are all hereby incorporated by reference herein in their entirety.

TECHNICAL FIELD

The present invention relates to a wireless communication system, and more particularly, to a method and apparatus for conducting communication using a Downlink (DL) oriented channel in a high-density Wireless Local Area Network (WLAN) system.

BACKGROUND ART

While DL channels as proposed hereinbelow may be used in various kinds of wireless communications, a WLAN system will be taken as an exemplary system to which the present invention is applicable.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

In IEEE 802.11, communication is conducted on a shared wireless medium. Therefore, the communication environment of IEEE 802.11 is fundamentally different from a wired channel environment. For example, communication can be conducted based on Carrier Sense Multiple Access/Collision Detection (CSMA/CD) in the wired channel environment. In other words, once a transmitter transmits a signal, the signal arrives at a receiver without much signal attenuation because there is no great change in the channel environment. If two or more signals collide with each other, they can be detected because power sensed at the receiver instantaneously gets larger than power transmitted by the transmitter.

However, since a channel is affected by various factors (e.g., signal attenuation may increase with a distance or the signal may suffer from instantaneous deep fading) in the wireless channel environment, the transmitter cannot determine by carrier sensing whether the receiver has received a signal successfully or signal collision has occurred.

DISCLOSURE

Technical Problem

In the above-described wireless communication system, there is a need for transmitting and receiving a signal by efficiently controlling interference between Stations (STAs). However, since data transmission from an Access Point (AP) may be delayed due to indirect control between STAs in a high-density Wireless Local Area Network (WLAN) system, a technique for efficiently performing data transmission from an AP to an STA is required.

Technical Solution

In an aspect of the present invention, a method of transmitting and receiving signals to and from an Access Point (AP) by a first Station (STA) in a Wireless Local Area Network (WLAN) system includes associating with the AP on a normal channel, switching to a downlink oriented channel and receiving data from the AP on the downlink oriented channel, during an active-mode operation, and switching to the normal channel and transmitting data to the AP on the normal channel. The first STA determines a time of transmitting the data to the AP by acquiring information about a first period and information about a second period, the first period being a time period during which data is received from the AP on the downlink oriented channel, and the second period is a time period during which data is transmitted to the AP on the normal channel.

In another aspect of the present invention, a method of transmitting and receiving signals to and from a first STA by an AP in a WLAN system includes associating with the first STA on a normal channel, transmitting data to the first STA on a downlink oriented channel during an active-mode operation of the first STA, and receiving data from the first STA on the normal channel Information about a first period and information about a second period are provided to the first STA to enable the first STA to determine a time of transmitting data to the AP, the first period being a time period during which the AP transmits data to the first STA on the downlink oriented channel, and the second period is a time period during which the first STA is allowed to transmit data to the AP on the normal channel.

In another aspect of the present invention, an STA for transmitting and receiving signals to and from an AP in a WLAN system includes a transceiver configured to transmit and receive signals to and from the AP, and a controller connected to the transceiver and configured to control the transceiver to transmit and receive signals to and from the AP on a normal channel or a downlink oriented channel. The controller is configured to associate with the AP on a normal channel, to control switching to the downlink oriented channel and reception of data from the AP on the downlink oriented channel, during an active-mode operation, to control switching to the normal channel and transmission of data to the AP on the normal channel, and control determination of a time of transmitting the data to the AP by acquiring information about a first period and information about a second period, the first period being a time period during which data is received from the AP on the downlink oriented channel, and the second period is a time period during which data is transmitted to the AP on the normal channel.

In another aspect of the present invention, an AP for transmitting and receiving signals to and from a first STA in a WLAN system includes a transceiver configured to transmit and receive signals to and from the first STA, and a controller connected to the transceiver and configured to control transmission and reception of signals on a normal channel or a downlink oriented channel. The controller is configured to associate with the first STA on the normal channel, to control transmission of data to the first STA on the downlink oriented channel during an active-mode operation of the first STA, to control reception of data from the first STA on the normal channel, and to control transmission of information about a first period and information about a second period to the first STA to enable the first STA to determine a time of transmitting data to the AP, the first period being a time period during which the AP transmits data to the first STA on the downlink oriented channel, and the second period is a time period during which the first STA is allowed to transmit data to the AP on the normal channel.

Advantageous Effects

According to the present invention as described above, system performance can be increased and the data transmission delay of an STA can be minimized, by reducing the data transmission delay of an AP in a high-density WLAN situation in which a plurality of STAs are associated with a single AP.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a Downlink (DL) oriented channel, and a method and apparatus for conducting communication using a DL oriented channel in a high-density Wireless Local Area Network (WLAN) system. First, a WLAN system to which the present invention is applied will be described in detail.

Figure 1:
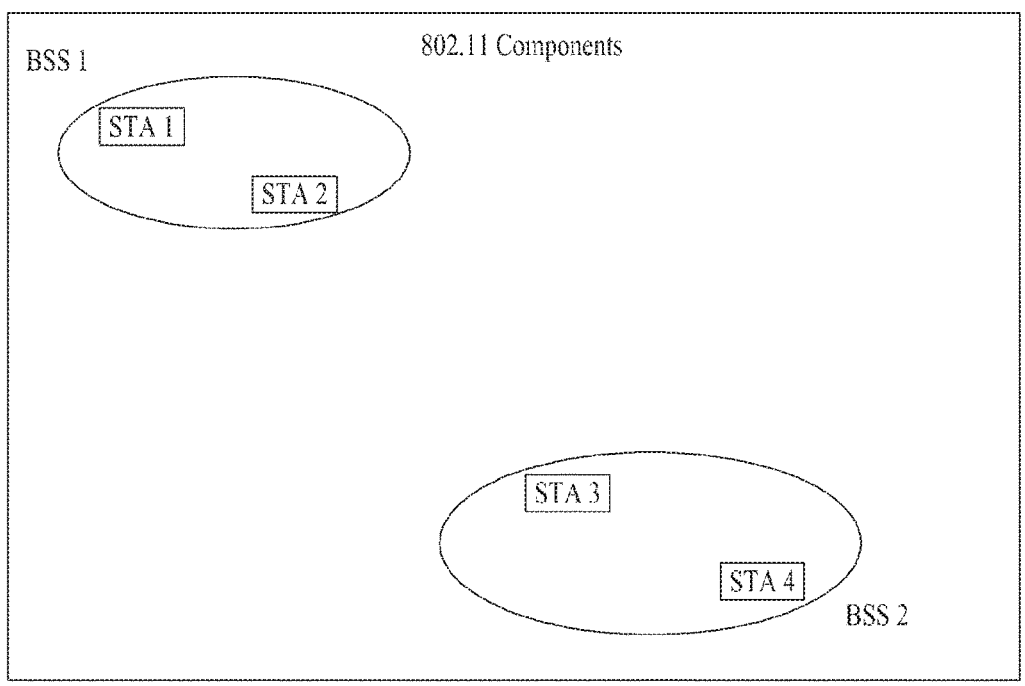
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
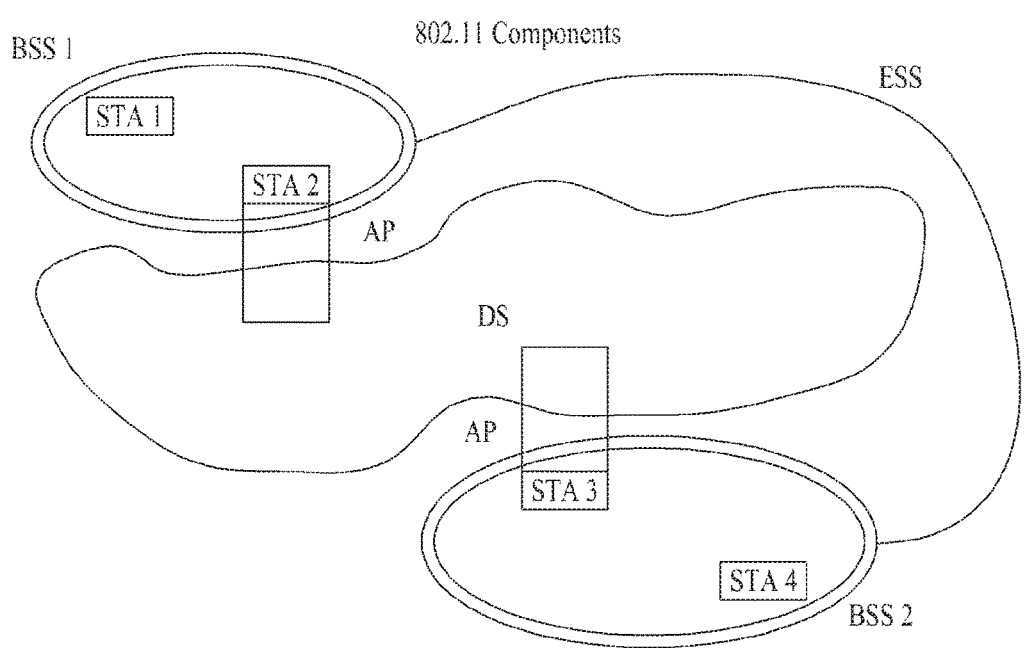
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Now, a collision detection scheme in a WLAN system will be described based on the above description.

Because various factors affect a channel in a wireless environment as described before, a transmitter is not capable of detecting a collision accurately. Accordingly, IEEE 802.11 has introduced a Distributed Coordination Function (DCF) being a Carrier Sense Multiple Access/Collision Avoidance (CSMA/CA) mechanism.

Figure 3:
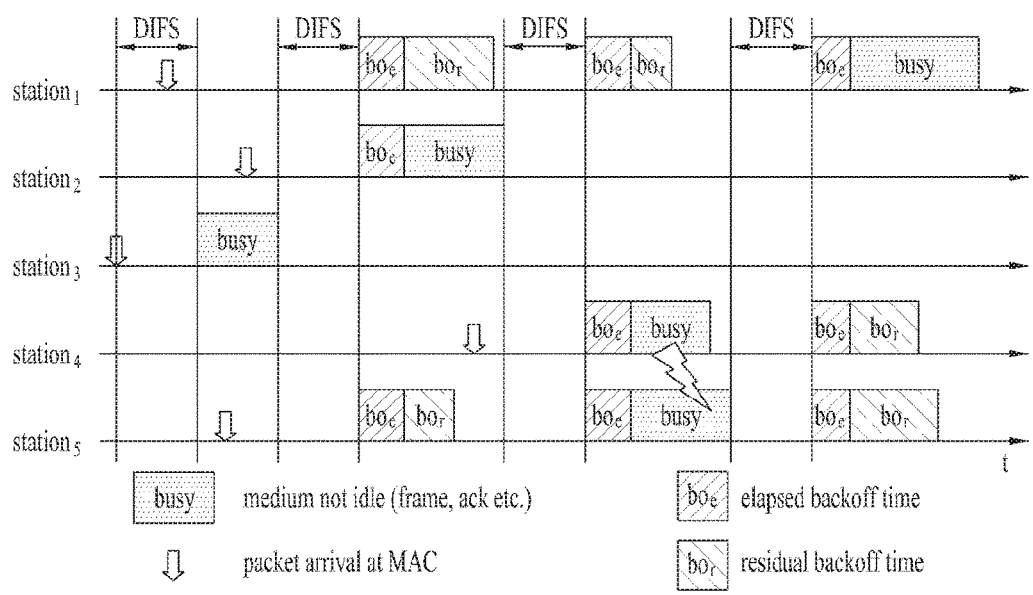
FIG. 3 is a diagram illustrating a Distributed Coordinated Function (DCF) mechanism in a WLAN system.

FIG. 3 illustrates a DCF mechanism in a WLAN system.

According to the DCF mechanism, STAs having transmission data perform Clear Channel Assessment (CCA) by sensing a medium during a specific duration (e.g., DCF Inter-Frame Space (DIFS)) before they transmit the data. If the medium is idle, an STA may transmit its data on the medium. On the contrary, if the medium is busy, the STA may transmit its data after further waiting a random backoff period, on the assumption that a plurality of STAs are waiting to use the medium. The random backoff period enables collision avoidance because each STA has a different backoff interval in probability and thus a different transmission time on the assumption that a plurality of STAs are to transmit data. Once one STA starts transmission, the other STAs may not use the medium.

A random backoff time and a random backoff procedure will be described in brief.

If a specific medium transitions from a busy state to an idle state, a plurality of STAs start to prepare for data transmission. To minimize collision, each STA selects a random backoff count and waits for as long a slot time period as the selected backoff count. The random backoff count is a pseudo-random integer and selected from a range of uniformly distributed values, 0 to CW. CW represents 'contention window'.

Although the CW parameter is initially set to CWmin, it is doubled upon transmission failure. For example, in the case where an ACK for a transmitted frame is not received, it may be determined that collision has occurred. If the CW value reaches CWmax, the STA maintains CWmax until the data transmission is successful. If the data transmission is successful, the CW value is reset to CWmin. Preferably, CW, CWmin, and CWmax are maintained to be $2^n-1$, for the convenience of configuration and operation.

When the random backoff procedure starts, the STA selects a random backoff count from the range of the values 0 to CW and continuously monitors the medium while counting down backoff slots according to the random backoff count. If the medium gest busy, the STA discontinues the count-down. When the medium becomes idle, the STA resumes the count-down of the remaining backoff slots.

Referring to FIG. 3, in the case where a plurality of STAs have data to be transmitted, STA3 may immediately transmit a data frame because the medium is idle during a DIFS, whereas the other STAs wait until the medium is idle. Since the medium has been busy for some time, a plurality of STAs may wait for an opportunity to use the medium. Therefore, each STA selects a random backoff count. Herein, STA2 selects a smallest backoff count and thus transmits a data frame in FIG. 3.

After STA2 completes the transmission, the medium gets idle. Then the STAs resume the count-down of the remaining backoff intervals. In FIG. 3, STA5, which has a second-smallest random backoff count and discontinued its count-down while the medium is busy, counts down the residual backoff slots and starts to transmit a data frame. However, the residual backoff time of STA5 happens to be equal to that of STA4. As a result, collision occurs between STA4 and STA5. Since, either STA4 or STA5 does not receive an ACK after the data transmission, STA4 and STA5 double CW values and select random backoff counts again.

As described before, the basics of CSMA/CA is carrier sensing. An STA uses physical carrier sensing and virtual carrier sensing to determine whether a DCF medium is busy or idle. A Physical layer (PHY) performs physical carrier sensing by energy detection or preamble detection. For example, if the PHY determines that a receiver has measured a voltage level or has read a preamble, it may determine that the medium is busy. In virtual carrier sensing, data transmission of other STAs is prevented by setting a Network Allocation Vector (NAV). This is done by means of a value of a Duration field in a MAC header. Meanwhile, a robust collision detection mechanism has been introduced to reduce the probability of collision. The reason for introducing the robust collision detection mechanism will be described with reference to the following two examples. For the convenience of description, it is assumed that a carrier sensing range is identical to a transmission range.

Figure 4:
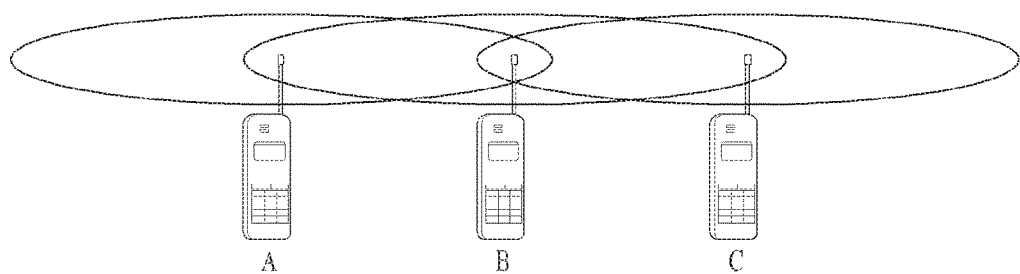
FIGS. 4 and 5 are exemplary diagrams describing problems encountered with a conventional collision resolution mechanism.
Figure 5:
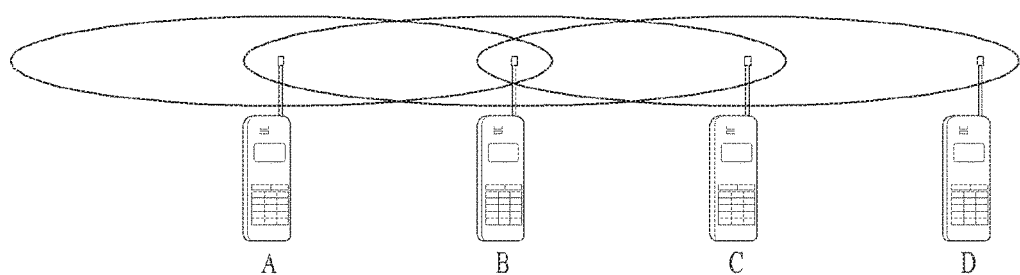

FIGS. 4 and 5 are exemplary diagrams describing problems encountered with a conventional collision resolution mechanism.

Specifically, FIG. 4 is a diagram describing a hidden node issue. In FIG. 4, STA A is communicating with STA B, and STA C has information to be transmitted. Specifically, STA C is likely to determine that a medium is idle during carrier sensing before transmitting data to STA B, although STA A is transmitting information to STA B. Collision occurs because STA B receives information from STA A and STA C simultaneously. Herein, it may be said that STA A is a hidden node to STA C.

FIG. 5 is a diagram describing an exposed node issue. In FIG. 5, STA B is transmitting data to STA A. STA C performs carrier sensing and determines that a medium is busy due to transmission of STA B. Therefore, although STA C has information to be transmitted to STA D, STA C should wait unnecessarily until the medium is idle since the medium is sensed as busy. That is, even though STA A is actually located out of the transmission range of STA C, STA C does not transmit information. Herein, STA C is an exposed node to STA B.

To efficiently utilize a collision avoidance mechanism in the above situation, short signaling packets such as Request To Send (RTS) and Clear To Send (CTS) frames may be introduced, so that neighboring STAs may determine by overhearing whether information is transmitted between two STAs. That is, if a transmitting STA transmits an RTS frame to a receiving STA, the receiving STA may indicate to its neighboring STAs that it will receive data by transmitting a CTS frame to the neighboring STAs.

Figure 6:
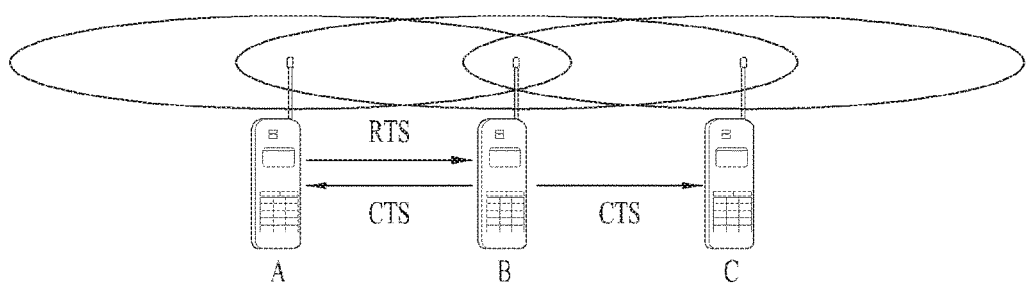
FIG. 6 is a diagram illustrating a mechanism of solving a hidden node issue using a Ready To Send (RTS)/Clear To Send (CTS) frame.

FIG. 6 illustrates a mechanism of solving the hidden node issue.

In FIG. 6, both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

Figure 7:
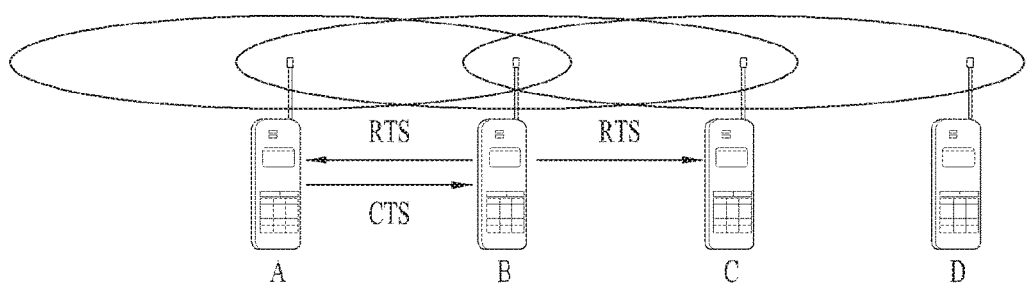
FIG. 7 is a diagram illustrating a mechanism of solving an exposed node issue using an RTS/CTS frame.

FIG. 7 illustrates a mechanism of solving the exposed node issue using an RTS/CTS frame.

It is noted from FIG. 7 that since STA C overhears RTSC/CTS transmission between STA A and STA B, transmission of STA C to STA D does not cause collision. That is, STA B transmits an RTS frame to all neighboring STAs, and only STA A having actual transmission data transmits a CTS frame. Since STA C receives only the RTS frame without receiving the CTS frame, STA C may be aware that STA A is outside the CS range of STA C.

Figure 8:
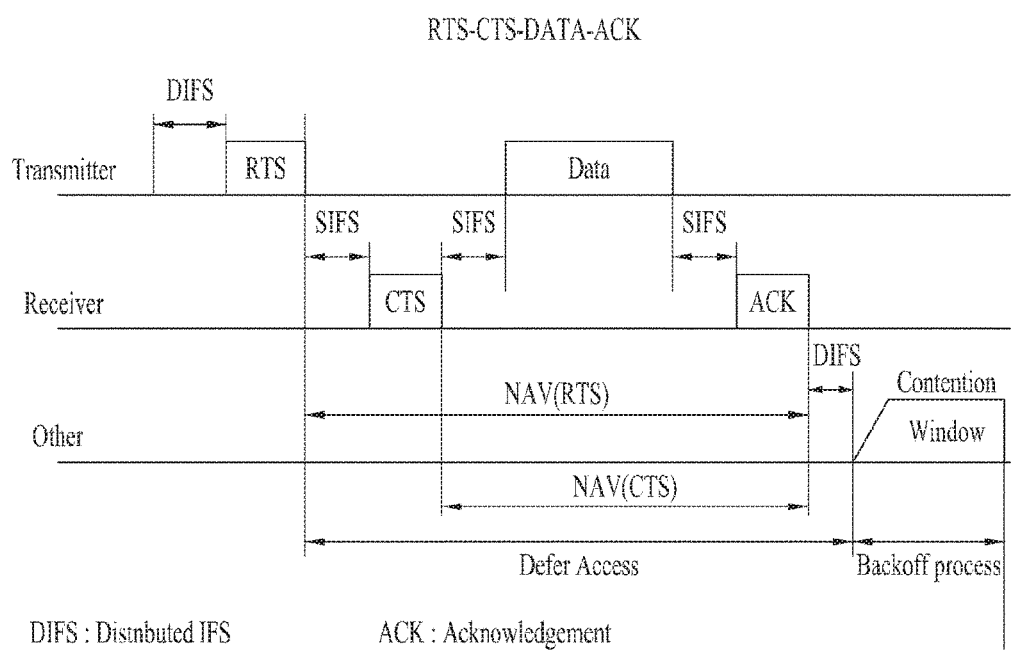
FIG. 8 is a diagram illustrating a specific operation method using an RTS/CTS frame.

FIG. 8 is a diagram illustrating a method for operating using the above-described RTS/CTS frame.

In FIG. 8, a transmitting STA may transmit an RTS frame to a receiving STA after a DIFS. Upon receipt of the RTS frame, the receiving STA may transmit a CTS frame to the transmitting STA after a Short IFS (SIFS). Upon receipt of the CTS frame from the receiving STA, the transmitting STA may transmit data after an SIFS, as illustrated in FIG. 8. Upon receipt of the data, the receiving STA may transmit an ACKnowledgement (ACK) in response to the received data.

Meanwhile, an STA, which has received the RTS/CTS frame of the transmitting STA among neighbor STAs, may determine whether a medium is busy according to reception or non-reception of the RTS/CTS frame, as described before with reference to FIGS. 6 and 7, and may set a Network Allocation Vector (NAV) accordingly. Upon expiration of a time period indicated by the NAC, the collision resolution operation described with reference to FIG. 3 may be performed after a DIFS.

In the legacy WLAN system, a frame is transmitted in a contention-based manner according to a predetermined criterion (e.g., DCF, Enhanced Distributed Channel Access (EDCA), and the like) irrespective of an AP or a non-AP STA. For example, in a state where 100 non-AP STAs are associated with a single AP, every STA transmits a frame equally by contention irrespective of an AP or a non-AP STA. In an actual WLAN environment, the amount of data that an AP transmits to all STAs is larger than or approximate to the amount of data that every STA transmits to the AP. Accordingly, if the AP has data to be transmitted to a number of STAs and many STAs have transmission data, contention may be heated or many collisions may occur. As a consequence, as the AP transmits data to the last STA with a time delay, a user's Quality of Service (QoS) may not be satisfied, or a packet transmission timeout may occur, thus causing discarding of a packet. This situation may be fatal to real-time service such as audio/video streaming.

Moreover, a large amount of data transmitted by the AP may delay transmissions of STAs and thus increase the number of STAs attempting frame transmission. In this case, UL transmissions are suddenly concentrated after a DL transmission, resulting in lots of collisions from hidden nodes as described before.

In this high-density WLAN environment, the present invention proposes that an AP operates a DL oriented channel to reduce DL-UL collision.

Figure 9:
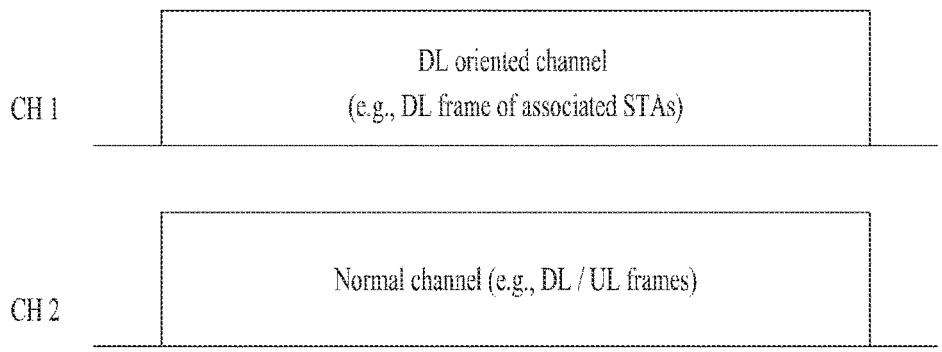
FIG. 9 is an diagram describing the concept of a downlink oriented channel in a WLAN system according to an embodiment of the present invention.

FIG. 9 is a diagram describing the concept of a DL oriented channel in a WLAN system according to an embodiment of the present invention.

As illustrated in FIG. 9, the embodiment of the present invention proposes that when one or more channels are available to an AP, the AP configures one or more channels as DL oriented channels for transmitting data to STAs associated with the AP. In FIG. 9, CH 1 represents a DL oriented channel according to the embodiment, and CH 2 represents a normal channel.

The AP should have normal channels for association of STAs or for supporting legacy STAs. That is, it is assumed that an STA is associated with the AP and transmits and receives data on CH 2 in the same manner as in the legacy WLAN system.

Meanwhile, it is proposed that the AP transmits data to STAs associated with the AP on the DL oriented channel, CH 1 introduced according to the embodiment, without the afore-described contention with UL data transmissions, and receives UL data on the normal channel CH 2. The DL oriented channel is different from the normal channel in that UL data transmission is not performed on the DL oriented channel. However, a control signal (e.g., ACK/Negative ACK (ACK/NACK) of an STA related to data transmission of the AP may be transmitted on the DL oriented channel.

A description will be given below of an operation of an active-mode STA using the above-described DL oriented channel.

Figure 10:
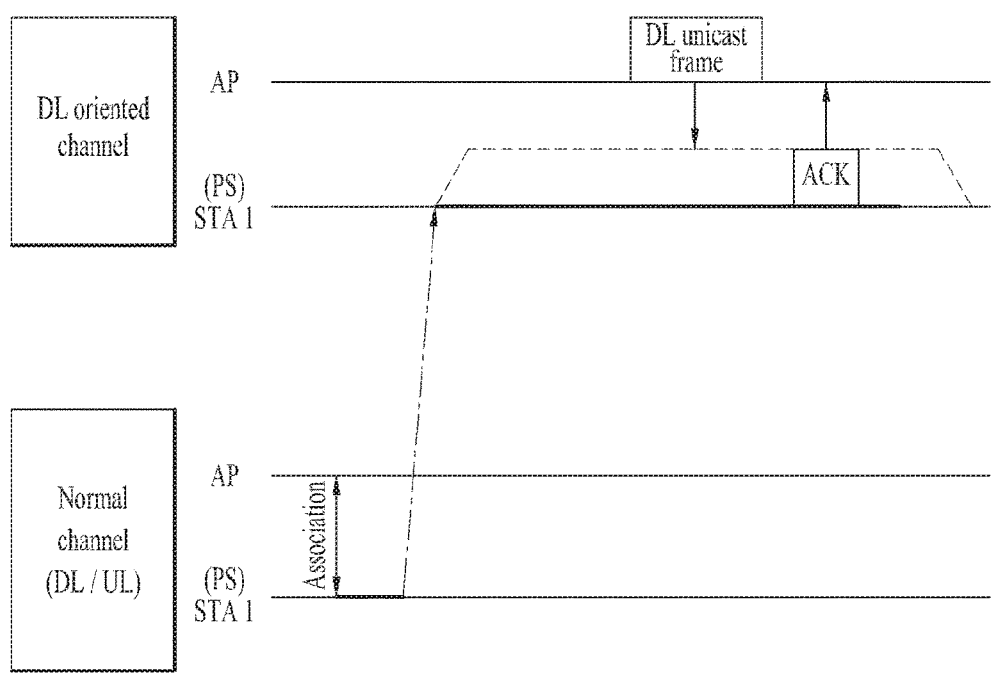
FIG. 10 is a diagram illustrating a method of operating using a downlink oriented channel by an active-mode Station (STA) according to an embodiment of the present invention.

FIG. 10 is a diagram illustrating a method of operating using a DL oriented channel by an active-mode STA according to an embodiment of the present invention.

According to the embodiment, STA 1 may be associated with an AP conventionally. STA 1 may use a normal channel during the association. Meanwhile, if STA 1 associated with the AP operates in active mode, the AP may generally perform the afore-described CCA by switching to a DL oriented channel according to the embodiment. If it turns out from the CCA result that the AP is allowed to transmit data to STA 1, the AP transmits data to STA 1 on the DL oriented channel. Thus, STA 1 may transmit an ACK on the DL oriented channel to the AP.

Figure 11:
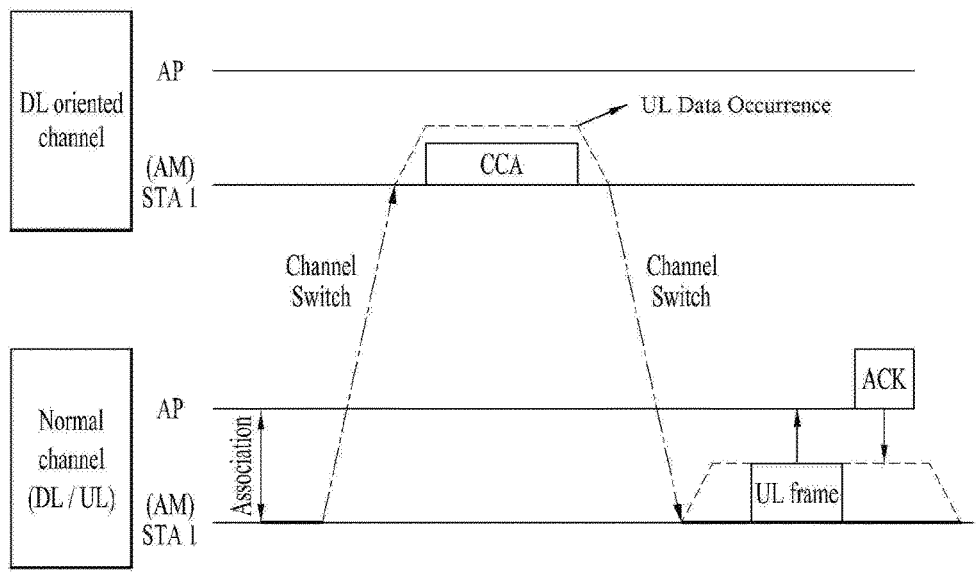
FIG. 11 is a diagram illustrating a method of transmitting Uplink (UL) data by an Active-Mode STA (AM-STA) according to an embodiment of the present invention.

FIG. 11 is a diagram illustrating a method of transmitting UL data by an Active-Mode STA (AM-STA) according to an embodiment of the present invention.

As described before, an STA may not transmit data to an AP on a DL oriented channel proposed according to the embodiment of the present invention. Therefore, upon occurrence of data to be transmitted to an AP with which STA1 has been associated on a normal channel during switching to a DL oriented channel and performing CCA, STA1 may switch again to the normal channel.

Having switched to the normal channel, STA1 may determine a data transmission time in the conventional contention manner (e.g., by EDCA) and transmit the data to the AP at the determined data transmission time.

In the case where STA1 switches to the normal channel and wins contention against other STAs by a conventional EDCA scheme in order to transmit UL data in an active mode as described with reference to FIG. 11, STA1 may transmit the UL data. Therefore, the AP may determine that STA1 still stays on the DL oriented channel until STA1 succeeds in transmitting UL data to the AP. Hereinbelow, a problem that may be generated in this situation will be described.

Figure 12:
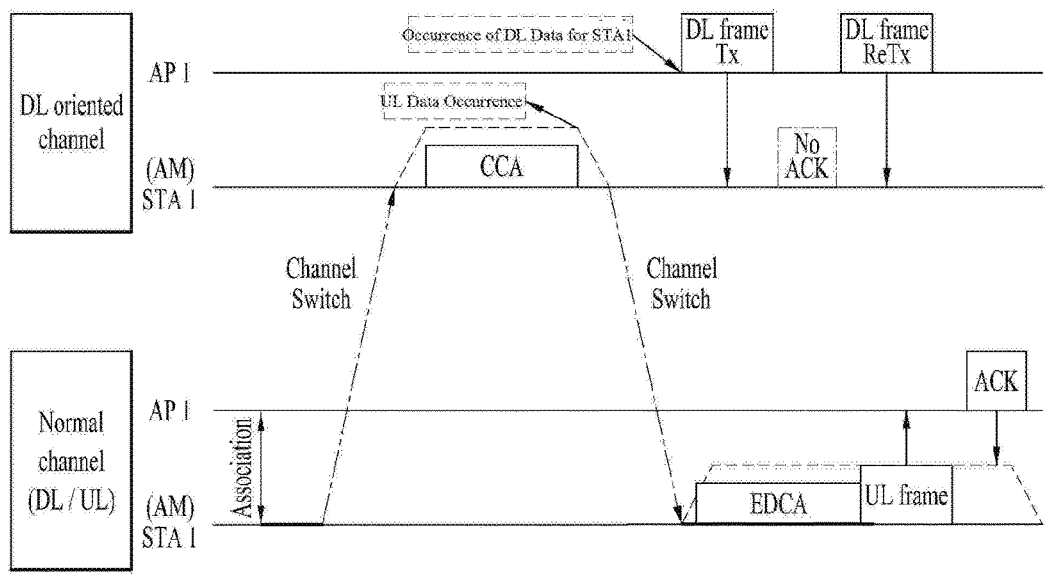
FIG. 12 is a diagram illustrating a problem that may be encountered with operating a Downlink (DL) oriented channel.

FIG. 12 is a diagram illustrating a problem that may be encountered with operating a DL oriented channel.

As described before with reference to FIG. 11, upon occurrence of UL data to be transmitted to the AP with which STA1 has been associated on a normal channel, after switching to a DL oriented channel, STA1 may switch to the normal channel again. However, if the AP has DL data to be transmitted STA1, the AP may attempt transmission on the DL oriented channel, determining that STA1 still stays on the DL oriented channel until before STA1 transmits the UL data. Because STA1 has already switched to the normal channel, STA1 may fail to receive a DL frame transmitted on the DL oriented channel by the AP.

Since the AP fails to receive an ACK from STA1, the AP may attempt to retransmit the DL frame.

Now, a description will be given below of various embodiments for solving the above-described problem.

Embodiment 1—Notification of Switching Through DL Oriented Channel

This embodiment proposes that an STA having a UL frame to be transmitted indicates to an AP on a DL oriented channel that the STA switches to a normal channel, for UL frame transmission, before transmitting the UL frame. Then the AP may be aware whether the STA is on the DL oriented channel or the normal channel and thus transmit a DL frame efficiently.

In this embodiment, however, because a UL control frame is transmitted on a DL oriented channel, a legacy AP may contend with an STA transmitting a UL frame, thereby degrading the system performance of the proposed DL oriented channel. Moreover, if a number of STAs attempt to transmit a UL frame, the STAs simultaneously attempt the transmissions after waiting until the DL oriented channel gets idle. As a consequence, contention or collision is highly likely to occur.

Embodiment 2—Notification of Switching Through Normal Channel

In this embodiment, an STA having a UL frame to be transmitted may attempt data transmission after switching to a normal channel to transmit the UL frame and then immediately transmit a switching signal to an AP on a normal channel Upon receipt of the switching signal, the AP may be aware that the STA is on the normal channel.

The method according to this embodiment may cause unnecessary overhead in the case of small frame transmission. Thus, the method is efficient in transmission of a large UL frame.

Since the UL switching signal is an additional signal, a frame carrying corresponding information should be minimized. For example, the corresponding information (a signal indicating switching to the normal channel, for UL transmission) may be transmitted in a SIG field of a Null Data Packet (NDP) frame or in a MAC control frame.

Embodiment 3—Data Transmission without Delay Through Normal Channel

This embodiment proposes that after switching to a normal channel, for UL data transmission, an STA immediately transmits data to an AP.

When a transmission data frame is small in size or STAs attempt a small number of UL frame transmissions, data transmission may be efficient. However, because many collisions or contentions may occur in a high-density STA network, data transmission is delayed. As a result, the AP may acquire switching information about the STA at a later time than supposed, and the afore-mentioned probability of wrong DL frame transmission at the AP may be increased.

Embodiment 4—Setting of DL Data Reception Period

This embodiment proposes that DL frame download periods are allocated to HEW STAs. According to the embodiment, an AP transmits a DL frame to an STA during a predetermined period allocated to the STA, without transmitting a DL frame to the STA during the other periods. Therefore, the STA may attempt to transmit a UL frame during a time period other than the predetermined period.

Figure 13:
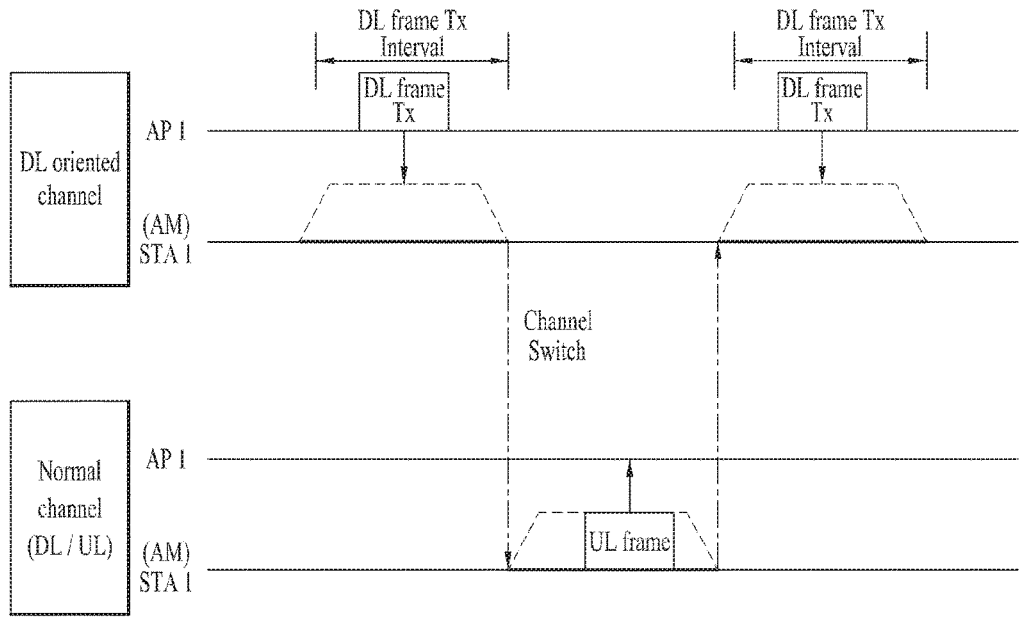
FIG. 13 is a diagram illustrating a method of indicating a DL data transmission period through a DL oriented channel according to an embodiment of the present invention.

FIG. 13 is a diagram illustrating a method of indicating a DL data transmission period through a DL oriented channel according to an embodiment of the present invention.

Specifically, an AP may indicate DL data transmission periods to STAs associated with the AP in various manners. Upon occurrence of UL data, the STAs may transmit the UL data to the AP during time periods other than their DL data transmission periods.

A different DL data transmission period may be configured for each STA or each STA group. One DL data transmission period may be allocated to one or more STAs. Also, a DL frame transmission period of one STA may overlap with a DL frame transmission period of another STA.

Information about DL data transmission periods may be broadcast (e.g., by a Beacon/Short Beacon frame) or unicast (e.g., a Probe Response or an Association Response) to STAs, and may include information about the starting times (e.g., time offsets/time stamps) of the DL data transmission periods and information about the durations (or end times) of the DL data transmission periods. The information about the DL data transmission periods may be transmitted in other manners. Meanwhile, a DL frame transmission period may be configured periodically. For this purpose, information about the DL frame transmission period may include periodicity information.

Embodiment 5—Setting of UL Data Transmission Period

This embodiment propose that an AP presets a UL frame transmission period, instead of a DL frame transmission period as used in Embodiment 4.

Figure 14:
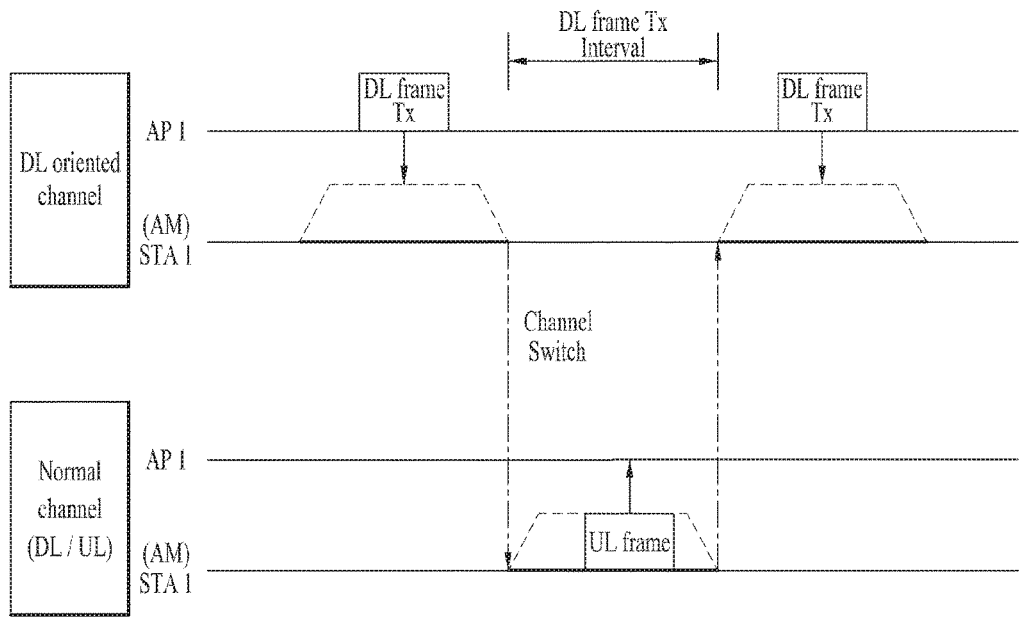
FIG. 14 is a diagram illustrating a method of indicating a UL data transmission period through a normal channel according to an embodiment of the present invention.

FIG. 14 is a diagram illustrating a method of indicating a UL data transmission period through a normal channel according to an embodiment of the present invention.

In this case, an AP may not transmit a DL frame to an STA during a predetermined UL data transmission period allocated to the STA. The STA may attempt to transmit a UL frame during the predetermined UL data transmission period, without attempting to transmit a UL frame during the other time periods.

A different UL data transmission period may be configured for each STA or each STA group. One UL data transmission period may be allocated to one or more STAs. Also, a UL frame transmission period of one STA may overlap with a UL frame transmission period of another STA.

Information about UL data transmission periods may be broadcast (e.g., by a Beacon/Short Beacon frame) or unicast (e.g., a Probe Response or an Association Response) to STAs, and may include information about the starting times (e.g., time offsets/time stamps) of the UL data transmission periods and information about the durations (or end times) of the UL data transmission periods. The information about the UL data transmission periods may be transmitted in other manners. Meanwhile, a UL frame transmission period may be configured periodically. For this purpose, information about the UL frame transmission period may include periodicity information.

Embodiment 6—Use of TIM for AM-STA

This embodiment proposes that an Active Mode Traffic Indication Map (AM-TIM) is used for STAs which are placed in the active mode on a DL oriented channel.

Figure 15:
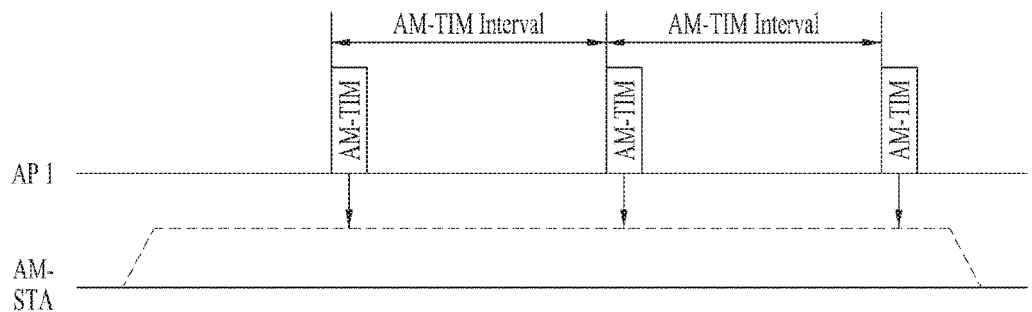
FIG. 15 is a diagram illustrating a method of operating a DL oriented channel using an Active-Mode Traffic Indication Map (AM-TIM) according to an embodiment of the present invention.

FIG. 15 is a diagram illustrating a method of operating a DL oriented channel using an AM-TIM according to an embodiment of the present invention.

An AM-TIM may include information about STAs to which DL traffic transmitted until before the next AM-TIM Transmission time (NATTT) is directed. That is, the AM-TIM indicates AM-STAs to which an AP has DL frames to be transmitted. Therefore, the AP may transmit an AM-TIM periodically on a DL oriented channel as illustrated in FIG. 15. Upon receipt of the AM-TIM, an STA may determine whether there is DL traffic destined for it until the next AM-TIM is transmitted.

The AP may transmit an AM-TIM in the same manner as for a beacon, if a channel is idle for a PIFS at a predetermined time point.

Figure 16:
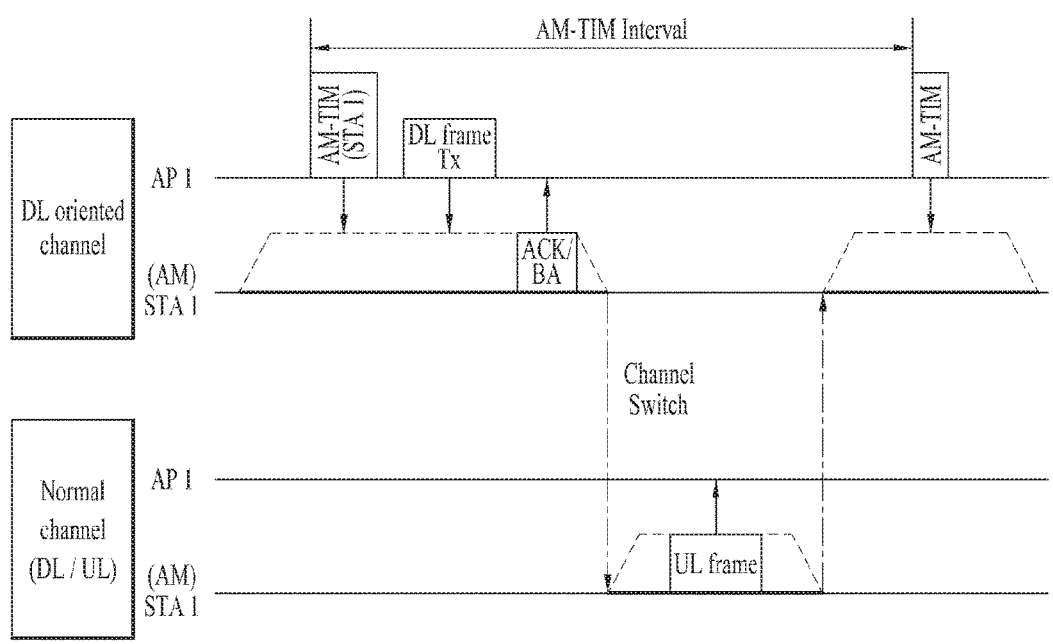
FIG. 16 is a diagram illustrating an operation method of an STA when an AM-TIM is used according to an embodiment of the present invention.

FIG. 16 is a diagram illustrating an operation method of an STA when an AM-TIM is used according to an embodiment of the present invention.

If an AM-TIM indicates the presence of its traffic within an AM-TIM interval, STA1 having a UL frame may wait until it receives a DL frame on a DL oriented channel until its DL traffic transmission is completed.

After its DL frame reception is completed, STA1 may switch to a normal channel until before the next AM-TIM interval starts and transmit a UL frame on the normal channel. If an STA fails to transmit a UL frame until before the start of the next AM-TIM transmission period, the STA may switch to a DL oriented channel before the next AM-TIM transmission time, and await reception of the next AM-TIM.

Upon receipt of the AM-TIM, if the AM-TIM does not include traffic indication information for the STA, the STA having a UL frame may switch to the normal channel at any time until before the next AM-TIM transmission, and transmit the UL frame. If the STA fails to transmit a UL frame until the starting time of the next AM-TIM transmission, the STA may switch to the DL oriented channel until before the starting time of the next AM-TIM transmission and awaits reception of the next AM-TIM.

Embodiment 6 may be regarded as a specified example of Embodiment 4. Also, Embodiment 5 may be implemented by indicating a UL frame transmission period using an AM-TIM in Embodiment 6.

Embodiment 7—UL Polling Method of AM-STA

An AP performs UL polling dynamically for AM-STAs through a DL oriented channel, and only STAs receiving the UL polling may witch to a normal channel and transmit a UL frame on the normal channel.

Figure 17:
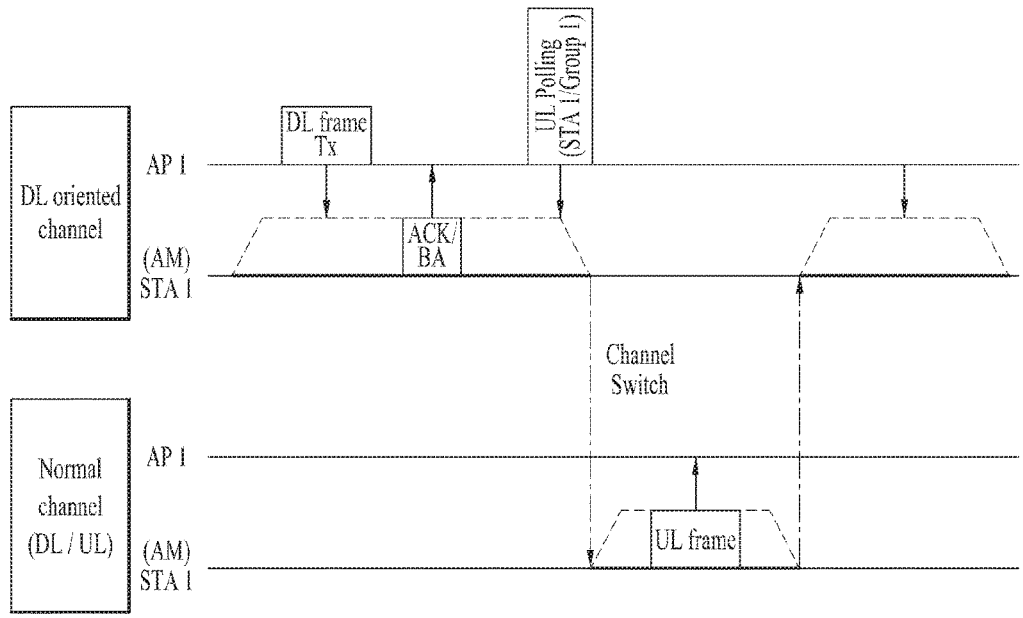
FIG. 17 is a diagram illustrating a method of switching to a normal channel and transmitting data to an AP on the normal channel by an STA, upon receipt of a UL polling according to an embodiment of the present invention.

FIG. 17 is a diagram illustrating a method of switching to a normal channel and transmitting data to an AP on the normal channel by an STA, upon receipt of a UL polling according to an embodiment of the present invention.

In this embodiment, a UL polling interval of an STA (or an STA group) may overlap with a UL polling interval of another STA (or another STA group).

Corresponding polling information may be unicast (e.g., a Polling frame or a new/legacy unicast frame) or multicast/broadcast (e.g., using a group ID) or to STAs, and may include information about the starting times (e.g., time offsets/time stamps) of polling intervals and information about the durations (or end times) of the polling intervals. The polling information may be transmitted in other manners.

The foregoing embodiments may be used independently or in combination, as operation methods using a DL oriented channel in a high-density WLAN system. Now, a method of efficiently preventing the transmission delay of an STA on the assumption of using Embodiment 6 among the foregoing embodiments.

If the embodiment described before with reference to FIG. 16 is used, an STA for which DL traffic exists among STAs receiving an AM-TIM first receives the DL traffic, and then switches to a normal channel and transmits UL data on the normal channel. However, if an AP transmits a DL frame on a DL oriented channel and an STA transmits a UL frame on a normal channel in the above method, an STA receiving a frame scheduled for the last of DL transmission periods may have a reduced number of UL frame transmission opportunities. Eventually, the STA may not transmit a UL frame on the normal channel until before the start of the next AM-TIM.

According to a preferred embodiment of the present invention for solving the above problem, it is proposed that an AP notifies STAs of information about an STA scheduled in the last place among STAs indicated by an AM-TIM and information about the starting time of a frame by a frame carrying the AM-TIM. Accordingly, it is proposed that the AP does not transmit a frame to corresponding STAs until the starting time of the corresponding scheduling. The corresponding STAs determine that the AP does not transmit a frame until the starting time of the scheduling. If an STA has a transmission frame, the STA may switch to a normal channel and transmit the frame on the normal channel to the AP.

Figure 18:
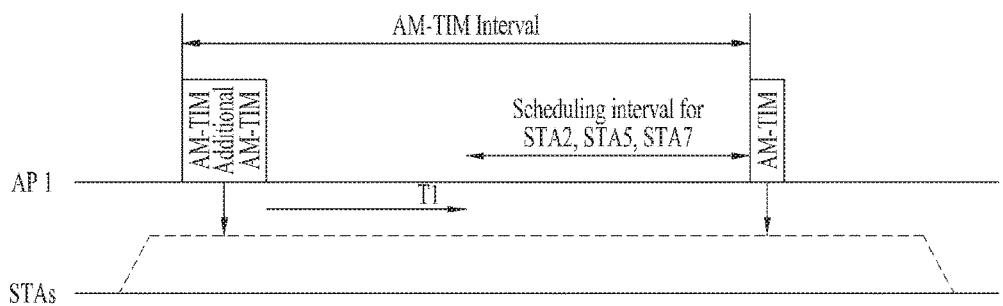
FIG. 18 is a diagram illustrating a method of transmitting information about a DL data transmission starting time in an AM-TIM on a DL oriented channel according to an embodiment of the present invention.

FIG. 18 is a diagram illustrating a method of transmitting information about a DL data transmission starting time in an AM-TIM on a DL oriented channel according to an embodiment of the present invention.

In the example illustrated in FIG. 18, an AM-TIM indicates the presence of frames to be transmitted to STA1, STA2, STA4, STA5, STA6, and STA7. Therefore, the STAs may receive the frames destined for them until the next AM-TIM interval. It is also proposed that an additional AM-TIM indicates a frame transmission starting time (TX start time=T1) for some STAs, STA2, STA5, and STA7. Therefore, determining that the AP will transmit frames from time T1, STA2, STA5, and STA7 may switch to a normal channel and transmit a UL frame until before time T1.

Figure 19:
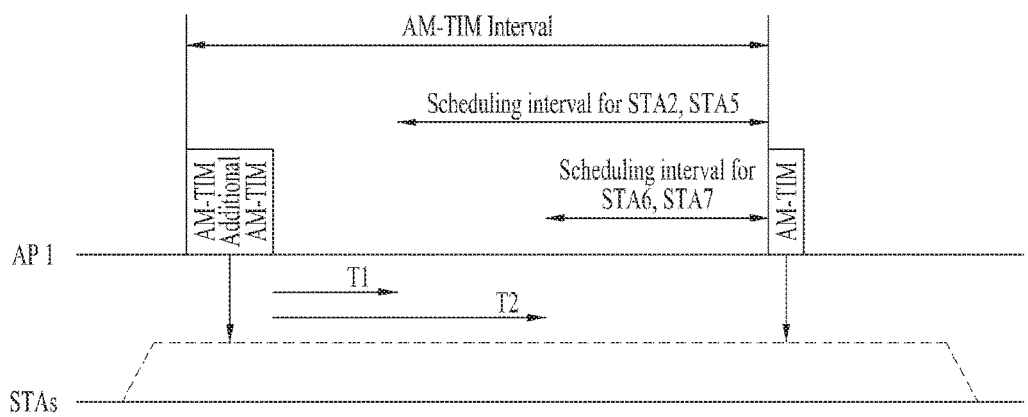
FIG. 19 is a diagram illustrating a method of transmitting information about a DL data transmission starting time in an AM-TIM on a DL oriented channel according to another embodiment of the present invention.

FIG. 19 is a diagram illustrating a method of transmitting information about a DL data transmission starting time in an AM-TIM on a DL oriented channel according to another embodiment of the present invention.

In the example illustrated in FIG. 19, two additional AM-TIMs are transmitted. A first additional AM-TIM includes frame transmission starting time information (T1) for STA2 and STA5, and a second additional AM-TIM includes frame transmission starting time information (T2) for STA6 and STA7.

In this case, STA2 and STA5 may switch to a normal channel and transmit frames until before the start of T1, and STA6 and STAT may switch to the normal channel and transmit frames until before the start of T2.

For an AM-TIM element, a TIM element format defined in 802.11—2012 or the hierarchical structure of a traffic indication virtual bitmap defined in 802.11ah may be used.

Figure 20:
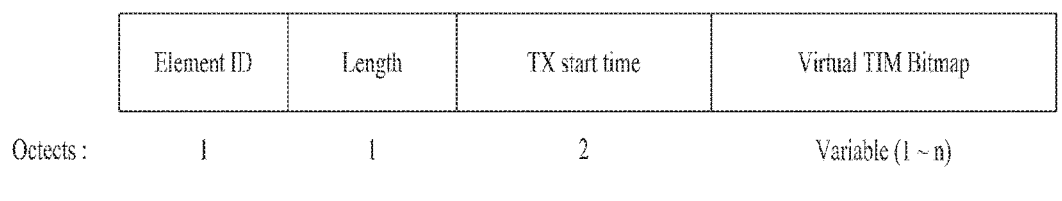
FIG. 20 illustrates a format of an additional AM-TIM element according to an embodiment of the present invention.

FIG. 20 illustrates a format of an additional AM-TIM element according to an embodiment of the present invention.

Element ID may indicate that this element is an additional AM-TIM element.

TX start time may indicate information about a time when DL frames start to be transmitted to STAs indicated by Virtual TIM Bitmap. The time information may be expressed as absolute time information (e.g., a time stamp or the Least Significant Bit (LSB) of the time stamp) or relative time information (e.g., a time offset, a timer value, or an interval, which starts after the additional AM-TIM). Although the time information is 2 bytes in size in the above example, it is apparent that the size of the time information may be changed according to information represented by the time information.

Virtual TIM Bitmap provides information about STAs to which DL frames are transmitted after a time indicated by TX start time. In the case of a bitmap structure, the size of Virtual TIM Bitmap may be set based on the number of STAs to which the presence of DL frames are known by the AM-TIM. For example, if the number of STAs set to 1 in the AM-TIM is 1 to 8, the size of Virtual TIM Bitmap may be set to 1 byte. If the number of STAs set to 1 in the AM-TIM is 9 to 18, the size of Virtual TIM Bitmap may be set to 2 bytes. Preferably, the positions of STAs in Virtual TIM Bitmap are determined in the order of STAs set to 1 in the AM-TIM.

Figure 21:
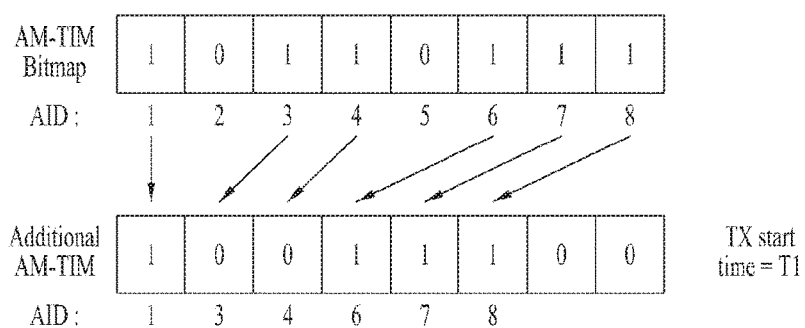
FIG. 21 illustrates an example of using the additional AM-TIM element illustrated in FIG. 20.
Figure 21:
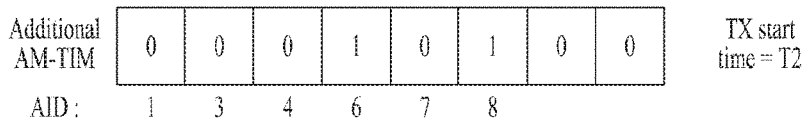

FIG. 21 illustrates an example of using the additional AM-TIM element illustrated in FIG. 20.

As illustrated in FIG. 21, an AM-TIM bitmap indicates STAs corresponding to AIDs of 1, 3, 4, 6, 7, and 8, and DL frames will be transmitted to the STAs.

It is assumed that the virtual TIM bitmap of an additional AM-TIM is configured in the order of the STAs (1, 3, 4, 6, 7, and 8), and the remaining bits for byte alignment (Bit 6 and Bit 7) are set to 0 and thus not used.

The virtual TIM bitmap of a first additional AM-TIM indicates AIDs of 1, 6, 7, and 8, and DL frames may be transmitted to STAs corresponding to these AIDs after time T1. The virtual TIM bitmap of a second additional AM-TIM indicates AIDs of 6 and 8, and DL frames may be transmitted to STAs corresponding to these AIDs after time T2.

In the presence of a second additional AM-TIM, information about STAs indicated by the second additional AM-TIM may be excluded in a first AM-TIM. In FIG. 21, the STAs having the AIDs of 6 and 8 are indicated by the second additional AM-TIM and thus only bits corresponding to the AIDs of 1 and 7 are set to 1 in the first additional AM-TIM. In this case, the AP may transmit DL frames to the STAs having the AIDs of 6 and 8 after time T2, not before time T2.

Figure 22:
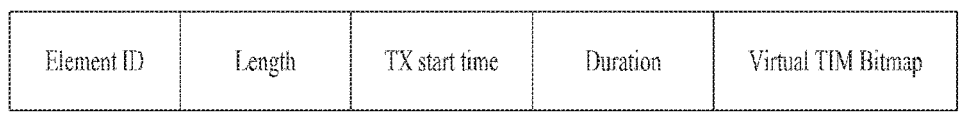
FIG. 22 illustrates a format of an additional AM-TIM element according to another embodiment of the present invention.

FIG. 22 illustrates a format of an additional AM-TIM element according to another embodiment of the present invention.

As illustrated in FIG. 22, an additional AM-TIM element may include information about the duration or ending time of a DL frame transmission. Herein, an AP does not transmit a DL frame after the duration or ending time.

Accordingly, a corresponding STA(s) may switch to a normal channel and transmit UL data on the normal channel after the ending time of a DL frame transmission period.

Figure 23:
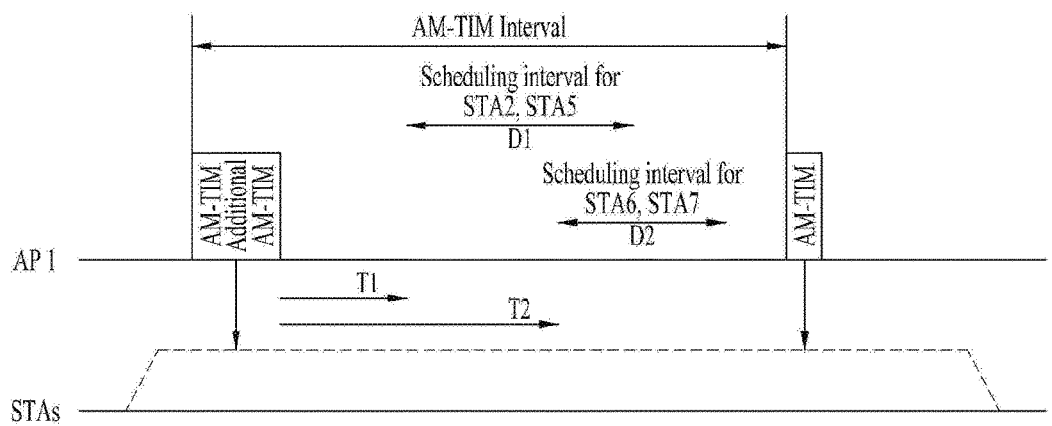
FIG. 23 is a diagram illustrating an operation method in the case of using the additional AM-TIM element illustrated in FIG. 22.

FIG. 23 is a diagram illustrating an operation method in the case of using the additional AM-TIM element illustrated in FIG. 22.

DL frames to be transmitted to STAs indicated by a virtual TIM bitmap may be delivered during a period defined by a transmission starting time and a duration. Transmission periods indicated by additional AM-TIMs may be overlapped with each other.

In the example of FIG. 23, a first additional AM-TIM indicates that a DL traffic transmission starts at time T1 and lasts a time period of duration D1 for STA2 and STA5. Therefore, STA2 and STA5 may switch to a normal channel and transmit data on the normal channel after a time period of T1+D1 from a reception time of the first additional AM-TIM.

Likewise, a second additional AM-TIM indicates that a DL traffic transmission starts at time T2 and lasts a time period of duration D2 for STA6 and STA7. Therefore, STA6 and STA7 may determine whether to switch to the normal channel according to the second additional AM-TIM.

Figure 24:
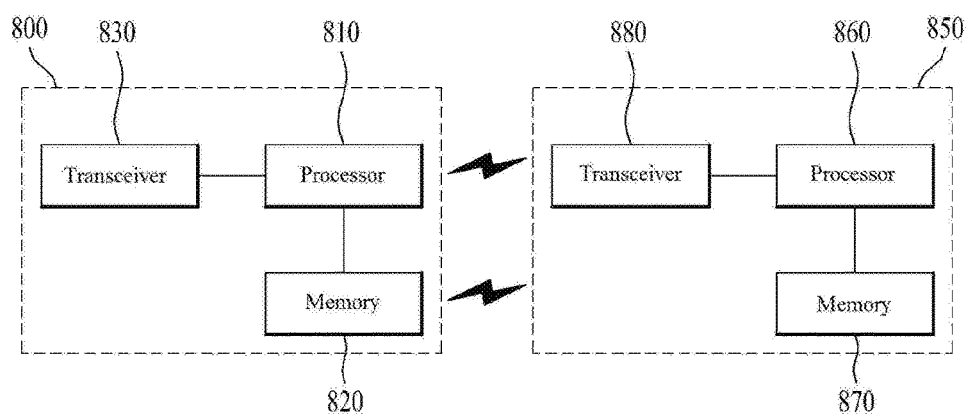
FIG. 24 is a block diagram illustrating apparatuses for implementing the above WLAN operation methods that use a DL oriented channel.

FIG. 24 is a diagram for explaining an apparatus for implementing the above-described method.

A wireless apparatus 800 of FIG. 24 may correspond to the above-described STA and a wireless apparatus 850 of FIG. 24 may correspond to the above-described AP.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the present invention has been described above in the context of an IEEE 802.11 WLAN system, the present invention is not limited to the specific system. Therefore, the present invention is applicable in the same manner to various wireless systems requiring control of interference between wireless devices, as in the case of device to device communication.

The invention claimed is:

1. A method of transmitting and receiving signals to and from an Access Point (AP) by a first Station (STA) in a Wireless Local Area Network (WLAN) system, the method comprising;
associating with the AP on a normal channel;
switching to a downlink oriented channel and receiving data from the AP on the downlink oriented channel, during an active-mode operation; and
switching to the normal channel and transmitting data to the AP on the normal channel,
wherein the first STA determines a time of transmitting the data to the AP by acquiring information about a first period and information about a second period, the first period being a time period during which data is received from the AP on the downlink oriented channel, and the second period is a time period during which data is transmitted to the AP on the normal channel.

2. The method according to claim 1, wherein the first STA acquires the information about the first period by receiving an information element including at least one of a starting time, a duration, and a periodicity of the first period.

3. The method according to claim 1, wherein the first STA acquires the information about the second period by receiving an information element including at least one of a starting time, a duration, and a periodicity of the second period.

4. The method according to claim 1, wherein at least one of the information about the first period and the information about the second period is acquired from an Active Mode Traffic indication Map (AM-TIM) received from the AP on the downlink oriented channel.

5. The method according to claim 4, wherein the AM-TIM is transmitted periodically and includes information about an STA to which the AP has data to be transmitted on the downlink oriented channel until a reception time of a next AM-TIM.

6. The method according to claim 5, wherein if the first STA is allowed to transmit data to the AP before receiving a next AM-TIM after receiving the data on the downlink oriented channel from the AP, the first STA switches to the normal channel after completion of the data reception and transmits data to the AP on the normal channel, switches to the downlink oriented channel after completion of the data transmission to the AP, and receives the next AM-TIM on the downlink oriented channel.

7. The method according to claim 4, wherein if the received AM-TIM indicates the absence of data to be transmitted to the first STA, the first STA switches to the normal channel after completion of the AM-TIM reception, transmits data to the AP on the normal channel, switches to the downlink oriented channel after completion of the data transmission to the AP, and receives a next AM-TIM.

8. The method according to claim 4, wherein the AM-TIM further includes information about a starting time of data transmission to an STA.

9. The method according to claim 8, wherein if the first STA determines that the first STA is capable of completing data transmission to the AP before the starting time of the data transmission, the first STA switches to the normal channel, transmits data to the AP, switches to the downlink oriented channel, and receives data from the AP on the downlink oriented channel.

10. The method according to claim 8, wherein the AM-TIM includes information about a starting time of data transmission from the AP to each STA to which the AP is to transmit data.

11. The method according to claim 1, wherein the downlink oriented channel is configured for the AP to transmit data to STAs associated with the AP, including the first STA, and the associated STAs are not capable of transmitting data to the AP on the downlink oriented channel.

12. A method of transmitting and receiving signals to and from a first Station (STA) by an Access Point (AP) in a Wireless Local Area Network (WLAN) system, the method comprising;
associating with the first STA on a normal channel;
transmitting data to the first STA on a downlink oriented channel during an active-mode operation of the first STA; and
receiving data from the first STA on the normal channel,
wherein information about a first period and information about a second period are provided to the first STA to enable the first STA to determine a time of transmitting data to the AP, the first period being a time period during which the AP transmits data to the first STA on the downlink oriented channel, and the second period is a time period during which the first STA is allowed to transmit data to the AP on the normal channel.

13. A Station (STA) for transmitting and receiving signals to and from an Access Point (AP) in a Wireless Local Area Network (WLAN) system, the STA comprising;
a transceiver configured to transmit and receive signals to and from the AP; and
a controller connected to the transceiver and configured to control the transceiver to transmit and receive signals to and from the AP on a normal channel or a downlink oriented channel,
wherein the controller is configured to associate with the AP on a normal channel, to control switching to the downlink oriented channel and reception of data from the AP on the downlink oriented channel, during an active-mode operation, to control switching to the normal channel and transmission of data to the AP on the normal channel, and control determination of a time of transmitting the data to the AP by acquiring information about a first period and information about a second period, the first period being a time period during which data is received from the AP on the downlink oriented channel, and the second period is a time period during which data is transmitted to the AP on the normal channel.

14. An Access Point (AP) for transmitting and receiving signals to and from a first Station (STA) in a Wireless Local Area Network (WLAN) system, the AP comprising;
   a transceiver configured to transmit and receive signals to and from the first STA; and
   a controller connected to the transceiver and configured to control transmission and reception of signals on a normal channel or a downlink oriented channel,
   wherein the controller is configured to associate with the first STA on the normal channel, to control transmission of data to the first STA on the downlink oriented channel during an active-mode operation of the first STA, to control reception of data from the first STA on the normal channel, and to control transmission of information about a first period and information about a second period to the first STA to enable the first STA to determine a time of transmitting data to the AP, the first period being a time period during which the AP transmits data to the first STA on the downlink oriented channel, and the second period is a time period during which the first STA is allowed to transmit data to the AP on the normal channel.

* * * * *